United States Patent Office 2,824,091
Patented Feb. 18, 1958

2,824,091

PRODUCTION OF SOLID NON-IONIC SURFACE ACTIVE AGENTS

Dennis Henry Desty and Charles Leslie Arthur Harbourn, Sunbury-on-Thames, England, assignors to The British Petroleum Company Limited No Drawing. Application December 21, 1953
Serial No. 399,614

Claims priority, application Great Britain December 31, 1952

11 Claims. (Cl. 260—96.5)

This invention relates to a process for the production of non-ionic surface active agents in solid form.

It is an object of the present invention to provide a process for the production of solid non-ionic surface active agents which are light in color.

According to the present invention, there is provided a process which comprises treating a non-ionic surface active agent with an excess by weight of solid urea, in the presence of a reaction diluent and a reaction activator, maintaining the mixture until urea adduct formation has taken place and separating the solid product, the pH of the reaction mixture, when tested as hereinafter defined, being initially within the range 2.5–7.0 and preferably with the range 5.0–7.0. Preferably the pH is maintained within said range during the reaction.

The pH of the reaction mixture, as defined for the purpose of the specification and appended claims, is the pH of a test sample of the reaction mixture after dilution with water to give a concentration of non-ionic surface active agent of 1% by weight of solution.

According to one manner of operation, the reaction mixture is brought to the required pH by the addition, to one or more of the reactants or to the mixture thereof, of an acid or acid anhydride.

Preferably the acid is anhydrous and is added to the liquid non-ionic surface active agent prior to admixture with urea. Any acid may be employed in this manner which is soluble, in the liquid non-ionic surface active agent, in the amounts required to provide the required pH. If water is present in admixture with the liquid non-ionic surface active agent, any acid anhydride may be employed which liberates free acid, soluble in said agent, in amounts required to provide the required pH.

Suitable inorganic acids are hydrochloric acid, sulphuric acid and phosphoric acid. Suitable organic acids are formic acid, acetic acid, oxalic acid and aromatic sulphonic acids.

Other suitable compounds for adjusting the pH are acidic oxides such as carbon dioxide, acid anhydrides such as acetic anhydride and phenols. Suitable reactor diluents are hydrocarbons or hydrocarbon mixtures in which the reactants and product are substantially insoluble and which do not, themselves, form adducts with urea under the reaction conditions. Preferably the diluent is a hydrocarbon containing five or six carbon atoms/molecule. Suitable diluents are, for example, n-pentane, iso-pentane, n-hexane, iso-hexane, cyclopentane, cyclohexane, and petroleum ether fractions boiling in the range 40–150° C. which have a low concentration of hydrocarbons which react with urea, or which are free of said hydrocarbons.

In general the reaction activators have some solvent action on urea. Suitable reaction activators include water; low molecular weight alcohols, for example, methanol, ethanol and glycerol: and ketones for example, acetone and methyl ethyl ketone.

Preferably the activator constitutes up to 20% by volume, based on the volume of reaction diluent employed. More particularly the proportion of activator constitutes 1–5% by volume, based on the volume of reaction diluent.

Preferred non-ionic surface active agents contain a chain of condensed ethylene oxide units.

Examples of these include the following:

(a) Products from fatty and resin acids comprising compounds of the general type

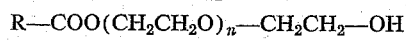

$$R\text{—}COO(CH_2CH_2O)_n\text{—}CH_2CH_2\text{—}OH$$

where R is a long chain alkyl group, preferably having 5–50 carbon atoms and $n$ is an integer, preferably in the range 5–50.

Commercial examples of these are the products "Ethofat 242/20" made by the Armour Corporation by reacting 1 mol. of "70% rosin fatty acids" with 10 mols. of ethylene oxide; "Ethofat 242/25" made by the Armour Corporation by reacting 1 mol. of "70% rosin fatty acids" with 15 mols. of ethylene oxide;

"Soromin SG," which is a stearypolyglycoether, the chain of ethylene oxide groups being on average 6 units in length;

"Renex" made by the Atlas Powder Company by reacting tall oil with ethylene oxide.

(b) Products from alcohols, comprising compounds of the general type:

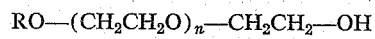

$$RO\text{—}(CH_2CH_2O)_n\text{—}CH_2CH_2\text{—}OH$$

where R is a long chain alkyl group preferably having 5–50 carbon atoms and $n$ is an integer preferably in the range 5–50.

Commercial examples of these compounds are the products:

"Aeto PC6" which is an alcoholic material of average chain length 15 and a hydroxyl number of 247 condensed with 6 mols. of ethylene oxide, "Aeto PC12" which is an alcoholic material of average chain length 15 and a hydroxyl number of 247 condensed with 12 mols. of ethylene oxide, "Brig 30" which is a condensation product of ethylene oxide with lauryl alcohol.

(c) Products from alkylated phenols comprising compounds of the general type.

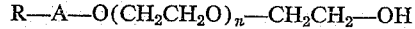

$$R\text{—}A\text{—}O(CH_2CH_2O)_n\text{—}CH_2CH_2\text{—}OH$$

where R is a long chain alkyl group preferably of 8–12 carbon atoms, A is an aromatic group and $n$ is an integer, preferably in the range 5–50.

Commercial examples of these are the products "Lissapol N," in which "R" is an alkyl group having, on average, 8 carbon atoms, "A" is a benzene ring and in which the value of "$n$" is approximately 12;

"Igepal C extra conc.," which is a condensate of 1 mol of dodecyl phenol with 12 mols. of ethylene oxide;

"Antarox A200," similar in composition to "Igepal C extra conc."

(d) Products from mercaptans of the general type

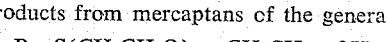

$$R\text{—}S(CH_2CH_2O)_n\text{—}CH_2CH_2\text{—}OH$$

where R is a long chain alkyl group preferably of 10–14 carbon atoms and $n$ is an integer, preferably in the range 5–50.

A commercial example is the American product "Nonic 218" made by Sharples Chemicals Inc., and which is a condensate of ethylene oxide with tertiary dodecyl mercaptan.

Usually the non-ionic surface active agent is reacted with urea in a ratio in the range 1:1 to 1:5 and preferably in the range 1:1 to 1:2 by weight.

Although water may be present in the mixture of non-ionic surface active agent and urea undergoing reaction, it is in general not desirable that it should be present in excess of 25% by weight of the surface active agent employed.

In general it will be found convenient to carry out the reaction of non-ionic surface active agent and urea at a temperature within the range 0–80° C. Preferably the temperature is maintained within the range 15–45° C.

The term "urea" as employed throughout this specification includes biuret within its scope.

It has been found that by the addition of acid to dark colored liquid non-ionic surface active agents, the color of said agents is reduced. Adducts formed by reaction of urea with acid-treated liquid non-ionic surface active agents are, in general, of lighter color than adducts formed by reaction of urea with liquid non-ionic surface active agents which have not received this treatment.

The invention is illustrated but in no way limited by the following example. By way of comparison there is provided details of an experiment wherein an alkaline reacting surface active agent was employed.

Example

"Lissapol NXA" was treated with glacial acetic acid until a test sample, diluted with water to a concentration of 1% by weight of solution, gave a pH value of 6.5 and thereafter mixed with 100 ml. of normal pentane and 1 ml. of methanol. 20 grams of urea was added and the mixture stirred for 1 hour, thereafter standing for 48 hours. The mixture was then filtered, the solid product obtained, after evaporation of the residual solvent being a light brown, free flowing powder.

Experiment

The method of the preceding example was carried out using 10 grams of "Lissapol NXA" having a pH of 9.4 (when tested as hereinbefore described) without adjustment of pH before or during reaction with urea. The solid product obtained, after evaporation of residual solvent, was a dark brown, slightly tacky powder.

We claim:

1. A process for the production of non-ionic surface active agents in solid form which comprises treating a non-ionic surface active agent having, in the molecule a chain of ethylene oxide units, with an excess by weight of solid urea, in the presence of a reaction diluent and a reaction activator, maintaining the mixture until urea adduct formation has taken place and separating the solid product, the pH of the reaction mixture, when tested as an aqueous solution containing 1% by weight of said agent, being initially within the range 2.5–7.0.

2. A process as specified in claim 1 in which the pH of the reaction mixture, when tested as an aqueous solution containing 1% by weight of said agent, lies initially within the range 5.0–7.0.

3. A process as specified in claim 2 in which the pH of the reaction mixture, when tested as an aqueous solution containing 1% by weight of said agent, is maintained within the range 5.0–7.0 throughout the reaction.

4. A process for the production of non-ionic surface active agents in solid form which comprises treating a non-ionic surface active agent, having, in the molecule, a chain of ethylene oxide units, with an excess by weight of solid urea and a small amount of a mineral acid, in the presence of a reaction diluent and a reaction activator, maintaining the mixture until urea adduct formation has taken place and separating the solid product, the pH of the reaction mixture, when tested as an aqueous solution containing 1% by weight of said agent, being initially within the range 2.5–7.0.

5. A process for the production of non-ionic surface active agents in solid form which comprises treating a non-ionic surface active agent, having, in the molecule, a chain of ethylene oxide units, with an excess by weight of solid urea in the presence of a small amount of an acid anhydride capable of reacting with water, under the conditions of the reaction of urea and non-ionic surface active agent, to form free acid and in the presence of water and a reaction diluent, maintaining the mixture until urea adduct formation has taken place and separating the solid product, the pH of the reaction mixture, when tested an an aqueous solution containing 1% by weight of said agent, being initially within the range 2.5–7.0.

6. A process as specified in claim 1 in which the reaction diluent is a hydrocarbon having 5 or 6 carbon atoms in the molecule and which does not form an adduct with urea.

7. A process as specified in claim 1 in which the reaction diluent is a petroleum ether fraction boiling in the range 40–150° C. and which contains only a small proportion of hydrocarbons which react with urea or which is free of said hydrocarbons.

8. A process as specified in claim 1 in which the reaction activator is a hydroxy-containing material selected from the group consisting of alcohols having 1–3 carbon atoms/molecule, water and mixtures of at least two of these compounds.

9. A process as specified in claim 1 in which, in the mixing zone, the reaction activator constitutes up to 20% by volume of the reaction diluent present.

10. A process as specified in claim 1 in which, in the mixing zone, the liquid non-ionic surface active agent is mixed with urea in a ratio up to 1:5 parts by weight.

11. A process as specified in claim 10 in which the agent is mixed with urea in a ratio up to 1:2 parts by weight.

References Cited in the file of this patent

UNITED STATES PATENTS

| | | |
|---|---|---|
| 2,002,613 | Orthner et al. | May 28, 1935 |
| 2,499,820 | Fetterly | Mar. 7, 1950 |
| 2,560,193 | Shoemaker | July 10, 1951 |
| 2,578,054 | Fetterly | Dec. 11, 1951 |
| 2,588,602 | Adams et al. | Mar. 11, 1952 |
| 2,595,300 | Safrin et al. | May 6, 1952 |
| 2,665,256 | Barker | Jan. 5, 1954 |
| 2,673,195 | Busso et al. | Mar. 23, 1954 |

FOREIGN PATENTS

| | | |
|---|---|---|
| 974,704 | France | Oct. 4, 1950 |